United States Patent [19]
Roy et al.

[11] Patent Number: 5,924,124
[45] Date of Patent: Jul. 13, 1999

[54] SOFTWARE PROGRAMMABLE BUS DISABLE SYSTEM

[75] Inventors: Santanu Roy, San Jose, Calif.; Farrell L. Ostler, Albuquergue, N.M.

[73] Assignee: Philips Electronics North America Corporation, New York, N.Y.

[21] Appl. No.: 08/863,266

[22] Filed: May 27, 1997

Related U.S. Application Data

[63] Continuation of application No. 08/308,046, Sep. 16, 1994, abandoned.

[51] Int. Cl.$^6$ .................................................. G06F 13/14
[52] U.S. Cl. ........................... 711/163; 711/150; 711/151; 711/152; 711/158; 711/213
[58] Field of Search ..................................... 711/163, 154, 711/101, 4, 147, 150, 151, 152, 158, 213, 145; 395/281

[56] References Cited

U.S. PATENT DOCUMENTS

| | | | |
|---|---|---|---|
| 4,851,989 | 7/1989 | Kagimasa et al. | 711/206 |
| 5,067,077 | 11/1991 | Wakimoto | 711/163 |
| 5,247,621 | 9/1993 | Gulick | 395/281 |
| 5,251,304 | 10/1993 | Sibigtroth et al. | 395/186 |
| 5,452,431 | 9/1995 | Bournas | 711/115 |
| 5,467,461 | 11/1995 | Nasu et al. | 711/147 |

FOREIGN PATENT DOCUMENTS 0478127  4/1992  European Pat. Off. ........ G06F 15/78

*Primary Examiner*—Eddie P. Chan
*Assistant Examiner*—T. . Nguyen
*Attorney, Agent, or Firm*—Anne E. Barschall

[57] ABSTRACT

A microcontroller, which is configured in a certain mode, may generate signals that can cause malfunctions of the microcontroller or of other devices. For example, a prefetch cycle at an internal memory boundary may attempt to access external memory via a port when the port is connected to an I/O device. The system of the invention gates such signals and thus prevents possible damage to the microcontroller or peripheral device. In a preferred embodiment, a software programmable register is provided with one location dedicated to storing a bit. When that register bit is set, it prevents certain signals and address/data from appearing at the port and thus possibly causing harm to the microcontroller or a peripheral device connected to the port.

9 Claims, 3 Drawing Sheets

SOFTWARE PROGRAMMABLE BUS DISABLE SYSTEM

This is a continuation of application Ser. No. 08/308,046, filed Sep. 16, 1994, now abandoned.

This invention relates to a computer, and in particular to a microprocessor or microcontroller having a multipurpose bus.

BACKGROUND OF THE INVENTION

Modern single chip microcontrollers with limited pin count often employ ports that can be configured to perform several functions. Under some circumstances, a port is used to access external memory to fetch instructions or data. In other circumstances, a port may be connected to a peripheral I/O device if the microcontroller is using only on-chip memory.

SUMMARY OF THE INVENTION

An object of the invention is a system that will prevent the microprocessor from malfunctioning as a result of signals being placed on a port at a time when the port is configured in a way such that the presence of those signals can cause a malfunction.

In accordance with one aspect of the present invention, when the port of a microcontroller is configured in a certain mode, signals that can cause malfunctions of the microcontroller or of other devices are gated and are thus prevented from bringing about a condition that can cause damage to the microcontroller or peripheral device.

In a preferred embodiment in accordance with the invention, a software programmable register is provided with one location dedicated to storing a bit. When that register bit is set, it prevents certain signals and address/data from appearing on the bus and thus possibly causing harm to the microcontroller or a peripheral device connected to the port.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described the preferred embodiments of the invention, like reference numerals or letters signifying the same or similar components.

DETAILED DESCRIPTION OF THE PREFERRED EMBODIMENTS

The invention is generally useful in all types of computers but is particularly useful in microcomputers especially when used as single chip microcontrollers (µC) to maximize I/O pin count. The invention will be described in connection with such a µC but it is to be understood that the invention is not so limited.

Figure 1:
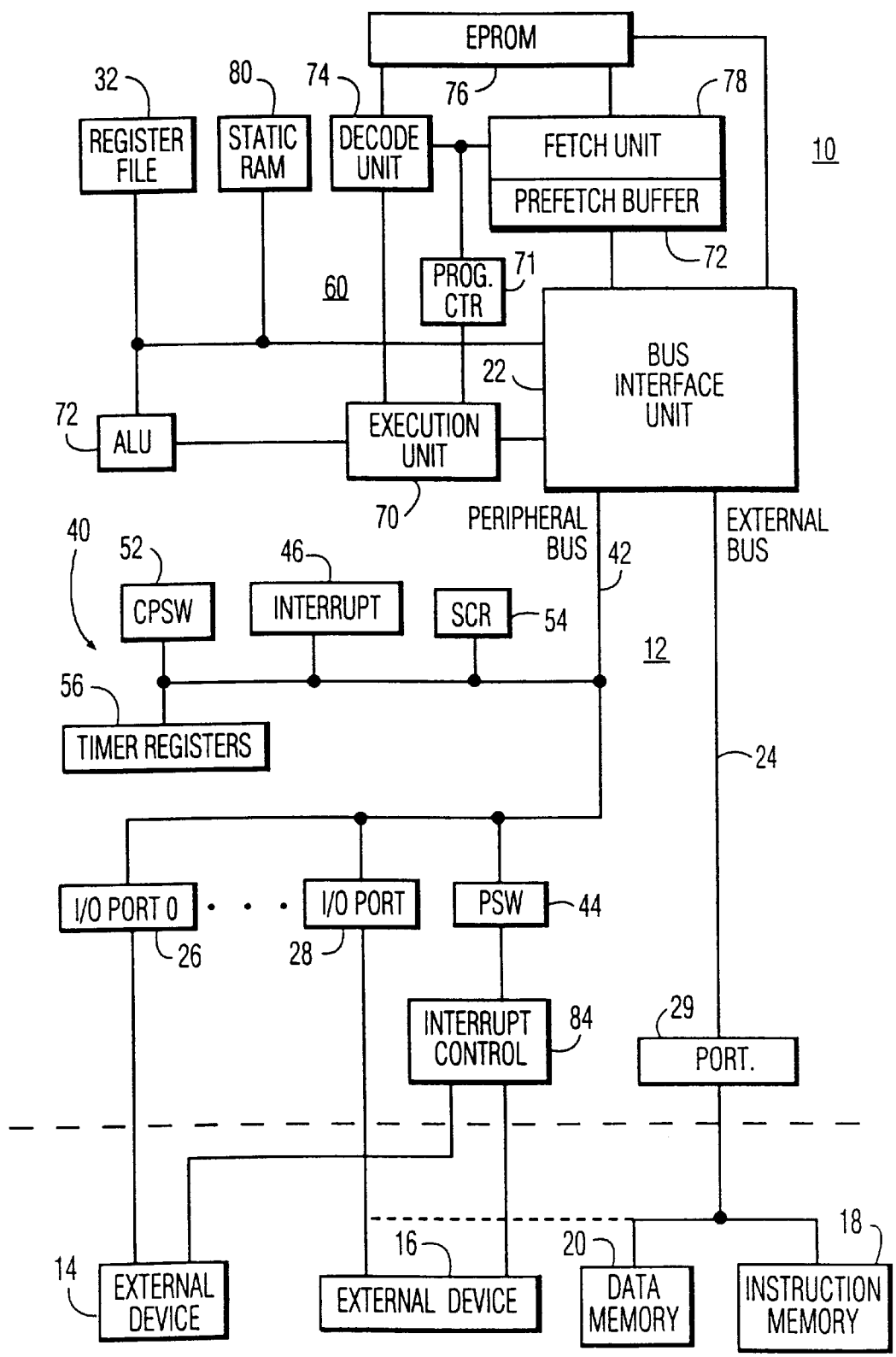
FIG. 1 is a block diagram of one form of microcontroller incorporating the invention.

FIG. 1 shows a schematic block diagram of a one-chip µC system 10. The system 10 includes a single chip microcontroller 12 that performs 16 bit arithmetic operations and includes internal instruction and data storage. The microcontroller 12 supports external devices 14 and 16 and, through 24 bit external address capability, supports sixteen megabytes of external instruction storage 18 and sixteen megabytes of external data storage 20. The microcontroller 12 includes a bus interface unit 22 which communicates with the external memories 18 and 20 over an external bi-directional address and data bus 24 through a port 29. The microcontroller 12 communicates with the external devices 14 and 16 through I/O ports 26–28 which are addressable as special function registers (SFR) 40. The ports 26–28 as well as other special function registers are addressable over an internal peripheral bus 42 through the bus interface unit 22. The data memory 20 can also be accessed as off-chip memory mapped I/O through the I/O ports 26–28, which access is illustrated by the dashed line. The on-chip special function registers 40 also include a program status word (PSW) register 44 coupled to an interrupt control unit 84 communicating with the external devices, an interrupt register 44, timer registers 50, a compatibility PSW register 52 used during operations where the microcontroller 12 is emulating other microcontrollers, a system configuration register (SCR) 54 containing system configuration bits, and others (not shown) not necessary to an understanding of the present invention. The bus interface unit 22 isolates the bit addressable peripheral special function registers 40 from the microcontroller core 60. The core 60 includes a microcoded execution unit 70 which controls execution of instructions by an ALU 72 and the other units. The instructions decoded by a decode unit 74 are fetched from an internal EPROM memory 76 or from the external instruction memory 18 by a fetch unit 78 which is controlled by a program counter 71 which contains the address of the next instruction to be executed. Static RAM 80 as well as general purpose registers of a register file 82 are also available for instruction and data storage. The dashed line 11 separates the on-chip units (above the line 11) from the devices external to the chip.

The SCR register 54, among other things, serves to control operating modes of the system 10. One such mode is a single chip mode or page zero mode. When a bit in this register is set, which usually is programmable and is intended to be programmed once after reset and left alone thereafter, the set bit acts as a flag that forces generation of, say, only 16-bit data and program memory addresses for small memory configuration applications when the on-chip memory 76, say 1K addressable by 16 bits, is adequate for the application. In this case, no external memory will be addressed during execution of the program and thus the port 29 used for external memory fetches, which supplies the high address byte for accessing external memory, can be used for other purposes. In other words, access to internal memory which contains only addresses that do not require a high address byte are, for example, accessible with only a 16-bit address. However, the memory locations in external memory require 24-bit addresses in this example. Thus, to access external memory, to the 16-bit address supplied on the bus 24 must be added an 8-bit high byte address supplied to the port 29. The bus 24 carries in addition also the control signals for reading and writing to external memory.

To speed up processing, the fetch unit includes a prefetch buffer 72 which functions to fetch and store a number of instructions from addresses ahead of the address of the instruction then being executed, sometimes referred to as a look-ahead system, on the assumption that most addressing of instructions is carried out sequentially and so fetch cycles can be saved by this known prefetch scheme. However, it is this prefetch operation that can cause problems in the event that the address from which an instruction was prefetched happens to be among the last addresses available in on-chip memory 76 which stores the program code, as the prefetch unit 72 will automatically increment addresses and try to fetch instructions at the next sequential incremented addresses in this look-ahead scheme. However, when the on-chip memory boundary is reached, the bus interface unit is automatically programmed to then direct the access attempt to external memory whose location addresses start where the location addresses of internal memory ends. To accomplish this function, for the example given, the bus interface unit 22 will place on the bus 24 the usual 16-bit address plus send the required read or write control signals, and place in the port 29 the high byte address needed to access the external memory locations. If it happens that the port 29 available to connect to external memory is instead being used as an I/O port for an external device, shown in phantom at 15 in FIG. 2, and, for example, that I/O device 15 is driving a pin of that port 29 low (for example to ground) while simultaneously the prefetch high address byte drives the same pin high (to the supply voltage), then it could lead to an effective short-circuit, a high current condition, and a malfunction of the μC or external device. Alternatively, if the external memory 18 happens to be connected to the port 29, but contains instructions irrelevant to the program currently executing in the zero-page mode, then an active read signal will cause an irrelevant instruction to be fetched by the prefetch unit and might be used by the execution unit which could cause the processor to enter an indeterminate state and lock-up.

Figure 2:
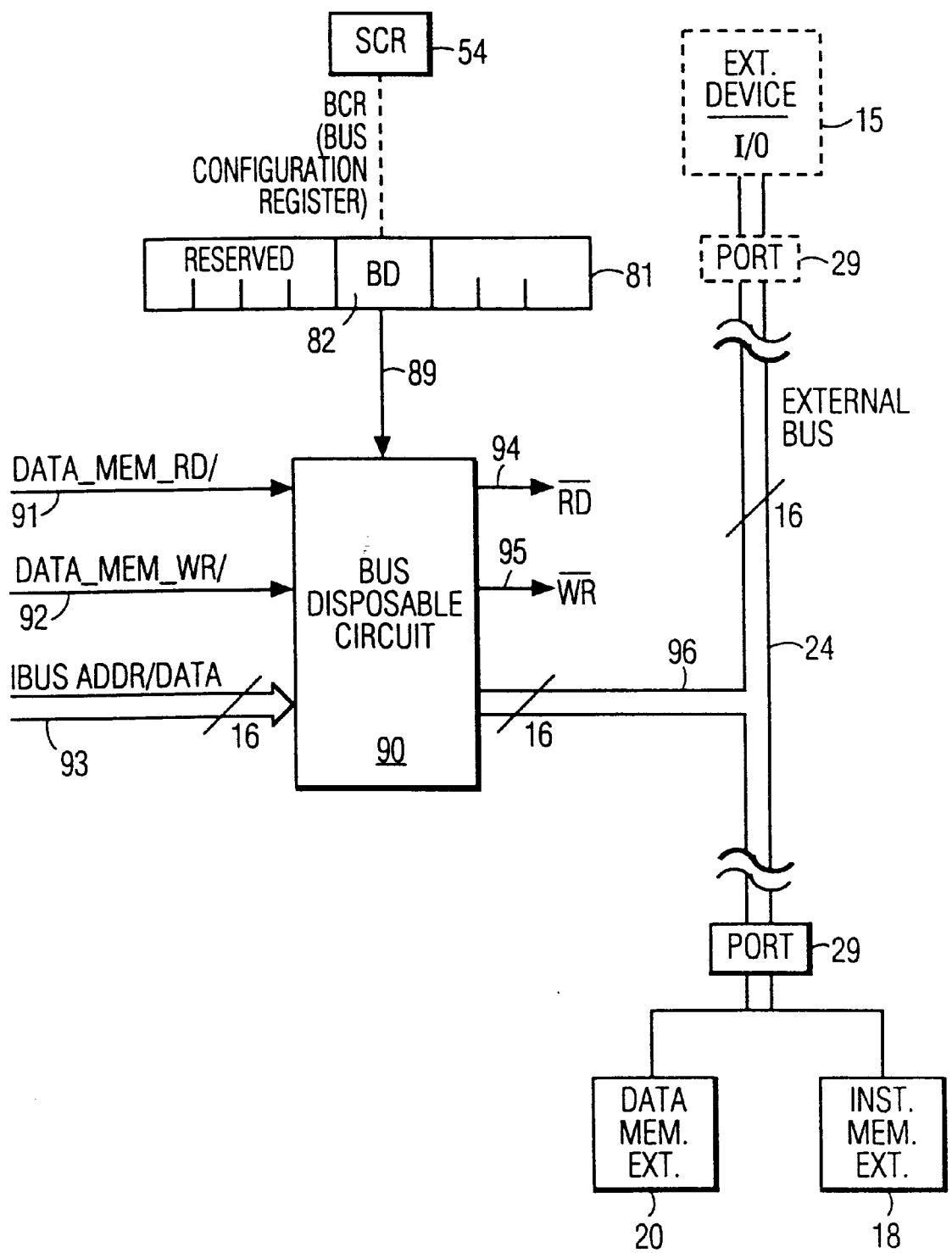
FIG. 2 is a block diagram of the bus disable part of the invention incorporated in the microcontroller of FIG. 1.

FIG. 2 shows one form of system for avoiding the above-noted problems. It does this, in the preferred embodiment, by gating the internal bus address/data, and some of the associated control signals, with a stored information item representing that the μC has been placed in its single-chip or zero-mode operating mode. In a preferred embodiment, a storage unit called a bus configuration register 81 is provided. A bit location 82 in that register is dedicated to storing a "1" which occurs automatically whenever the μC is placed by the operating program in its zero-page mode by setting a bit in the system configuration register (SCR) 54. Connected to that software programmable storage location 82 is a line 89 which provides a first input to a block 90 labelled "Bus disable circuit". Second, third and fourth inputs denoted, respectively, 91, 92, and 93 correspond, respectively, to a Data_mem_rd/ control signal, a Data_mem_write/control signal, and a 16 bit IBUS addr/data bus. The coresponding outputs from the block 90 are at lines 94, 95, and at bus 96.

When the BD bit is set, the block 90 functions to prevent the RD/ and WR/ control signal outputs from being sent to the port 29 pins, and to prevent the addr/data signals from appearing on the bus 24. This μC uses active low logic in some cases. Thus, the "/" following the two control signals in this specification and the drawings represents active low, as does the bar over a signal in the drawings represent the active low condition.

Figure 3:
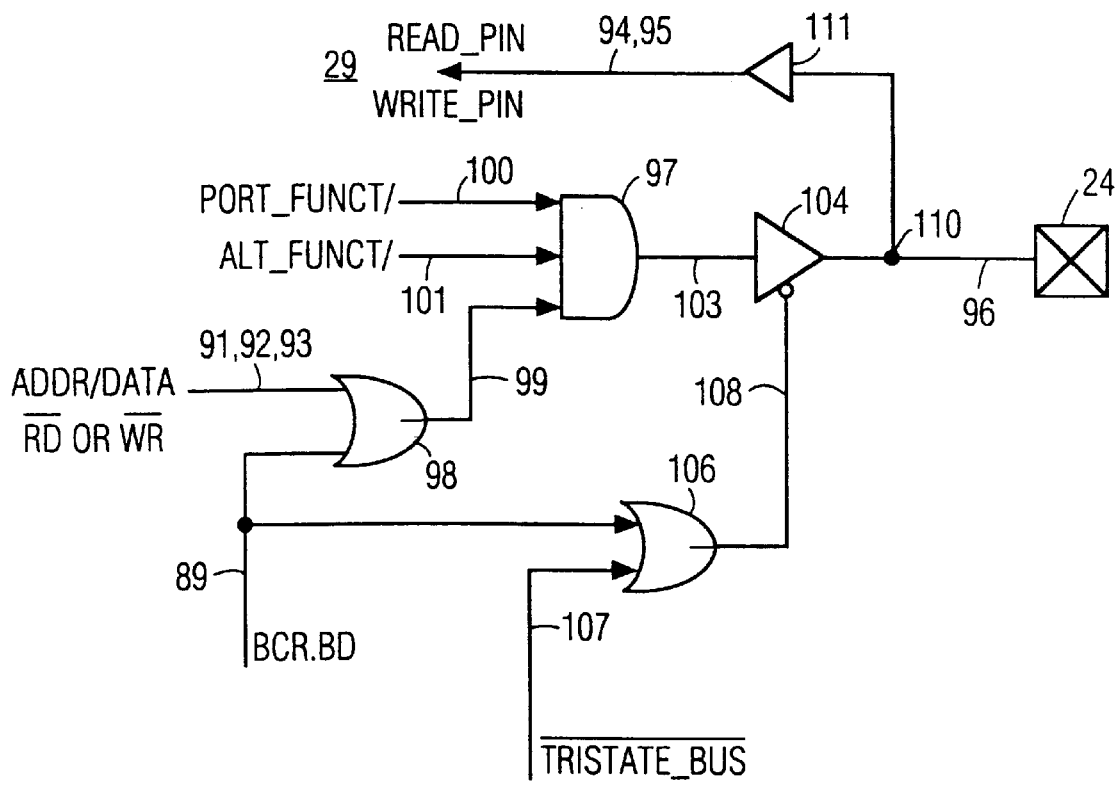
FIG. 3 is a schematic of one form of the disable circuit of FIG. 2.

FIG. 3 shows a schematic of one possible circuit for implementing the above, as well as other functions. In FIG. 3, the three input lines 91, 92, 93 of FIG. 2, for simplicity, are shown as a single input line to an OR gate 98. However, it will be understood that, in practice, each of the control signals RD/ and WR/, as well as the 16 addr/data lines, would have their own gating circuit. FIG. 3 represents a composite of the three gating circuits, which all operate similarly, and thus the FIG. 3 circuit clearly discloses one form of implementation of the bus disable circuit of the invention.

The output of the OR gate 98 is a first input 99 to an AND gate 97. The other two inputs 100, 101 are control signals Port_func/ and Alt_func/, which are both active low. In the normal inactive state, both Port_func/ and Alt_func/ are high ("1").

The "1" input when the BD bit is set in effect opens the OR gate 98, and whatever is inputted at the second input produces a "1" at the gate 97 output. The latter is inputted 103 to a controlled amplifier 104. At the same time, the set BD signal is inputted to an OR gate 106 whose other input 107 is an active low tristate_bus control signal, whose state is irrelevant when BD="1", because the output at line 108, which is a "1", is inverted and applied as a control signal to the controlled amplifier 104. The active state of the control signal of the latter is "0", so that the inverted "1", turns the controlled amplifier OFF. That means that the node 110 at its output goes into a high-impedance state, which effectively decouples the bus 24 and amplifier 111, whose output is connected to the read_pin or write_pin of the port 29, from the addr/data and RD/, WR/ inputs 91, 92, and 93 at the OR gate 98. Hence, the circuit shown prevents the control signals and address/data from being applied to the port pins, respectively bus, when the BD bit is set. In this instance, IBUS corresponds to an internal bus which is meant to place, for the example given, a 16-bit address or data on the external bus 24 in FIG. 1. Hence, when the BD bit is set into its high condition by the program, the control signals RD/ and WR/ needed to trigger reads from or writes to external memory would be missing. In other words, the provision of the bus configuration register 81 with its BD location 82, when set to a "1", gates all internal bus/address data and the associated control signals that share the port 29 pins with the external device 15 in the event an illegal external memory access is attempted. This includes the multiplexed IBUS address/data, and the control signals RD/ and WR/. The conventional ALE (address latch enable) signal and PSEN (program store enable) signal, which in this implementation do not share any port pins, need not be gated. So long as the BD bit is set, which normally will continue during execution of the entire current program, all accesses to external memories will be disabled thereby guaranteeing stable I/O operation of the microcontroller.

If on execution of another program, or in another controller, a large memory model program requiring access to external memories is to be executed, the program would not set or would clear the mode controlling bit in the SCR register 54 and the corresponding BD bit 82 would then be cleared. When the BD bit is low ("0"), an active low Data_mem_rd/ or Data_mem_wr/ in FIG. 2, shown as RD/ and WR/ in FIG. 3, will produce at the output of the OR gate 98 a corresponding active low RD/ or WR/ signal on the line 99 and thus the address/data on the IBUS will appear at the output 103 and will similarly be passed through the controlled amplifier 104 and when placed on the bus 24 and directed to the external memories 18, 20, in combination with the high byte address placed in the port 29, will allow normal external memory accesses for the corresponding read or write operation.

The Port_func control signal can be used to override disabling of the bus when the program sets the BD bit. The control signal Port_func would be used when it is desired to write a "1" or "0" to a particular port pin in connection with an I/O device connected to that port. When Port_func is active low, the AND gate 97 is disabled and other circuitry (not shown) can be used to write a "1" or "0" to a desired port pin. Alt_func operates similarly to disable the AND gate 97 under certain circumstances and allow the bus or lines to the port pins to be used for other purposes.

There may be circumstances when the bus 24 is not disabled, that is, is active, but when it is still desired to place the bus interface shown in a high-impedance condition. This is accomplished with the tristate_bus/ control signal. When that signal is asserted, the output of the OR gate 106 would be a "0", which turns the controlled amplifier 104 OFF and places its output into the desired high-impedance condition. This provides an option to the user to tristate the bus even while it is active.

It will be understood that the invention is not limited to the example given to illustrate the invention, or to the gate logic illustrated in FIG. 3. Those skilled in the art will recognize that other logic schemes producing the same functions can readily be substituted.

While the invention has been described in connection with preferred embodiments, it will be understood that modifications thereof within the principles outlined above will be evident to those skilled in the art and thus the invention is not limited to the preferred embodiments but is intended to encompass such modifications.

What is claimed is:

1. In a microcomputer comprising:

an internal memory having an internal memory boundary, means for communicating with at least one external memory having address space following the internal memory boundary, a port for communicating with an I/O device during a first operating mode, said first operating mode being when said I/O device uses only code or data stored in internal memory, the improvement comprising:

(a) means for preventing active control signals from being sent to the port when the microcomputer is in the first operating mode and an address for pre-fetching instructions is generated that exceeds the internal memory boundary, said means for preventing comprising:

(i) first means for storing mode information representing the microcomputer being placed in the first operating mode, and (ii) second means connected to the first means for disabling pre-fetch accesses by the microcomputer to the port whenever the information stored in the first means indicates that the microcomputer has been placed in the first operating mode.

2. The microcomputer as claimed in claim 1, wherein said first means comprises a register having a location dedicated to storing mode information.

3. The microcomputer as claimed in claim 2, wherein the second means comprises:

gating means having a first input connected to the register;

a second input connected to receive a control signal whenever a memory read or write operation is to be performed; and an output connected to the port, said gate producing a prefetch blocking output whenever the register location indicates that the microcomputer is in the first operating mode and otherwise producing a prefetch allowing output.

4. In a microcomputer comprising an internal memory having a number of data-storing locations defined by a first range of location addresses, an external bus leading to peripheral devices including an external memory having a second range of data storing locations outside of the first range and an I/O device, and a port connected to the external bus for communicating with the I/O device during a first operating mode, said first mode being when the I/O device uses only data stored in internal memory; and communicating with the external memory during a second operating mode, said second mode being when the I/O device uses data stored in the external memory, means for generating addresses of instructions and means for pre-fetching instructions from said addresses, the improvement comprising:

(a) means for preventing addresses in the second range from being sent to the port when the microcomputer is in the first operating mode, said means for preventing comprising:

(i) first means for storing mode information representing a condition that the microcomputer has been placed in the first operating mode; and (ii) second means connected to the first means for disabling external memory accesses by the microcomputer to the port via the bus whenever the information stored in the first means indicates that the microcomputer has been placed in the first operating mode but allowing such external memory accesses otherwise.

5. The microcomputer of claim 4, wherein the second means comprises gates having a first input connected to the first means, an output connected to the bus, and a second input connected to receive control signals.

6. The microcomputer of claim 5, wherein the first means comprises a software programmable register.

7. The microcomputer of claim 5, further comprising means for overriding the second means whereby the port is accessible to further signals.

8. In a microcomputer comprising an internal memory having an internal memory boundary, an external bus leading to peripheral devices including an external memory and an I/O device, and a port connected to the external bus for communicating with the I/O device during a first operating mode, the first operating mode being when the I/O device uses only data stored in internal memory; and communicating with the external memory during a second operating mode, the improvement comprising:

(a) means for preventing active control signals from being sent to the port when the microcomputer is in the first operating mode and an address for fetching instructions is generated that exceeds the internal memory boundary, said means for preventing comprising:

(i) first means for storing mode information representing the microcomputer being placed in the first operating mode, and (ii) second means connected to the first means for disabling the active control signals.

9. A microcomputer comprising:

a. prefetch means for prefetching and storing instructions, prefetched instructions being stored up to an internal memory boundary within the prefetch means, instructions after the boundary being located externally to the microcomputer;

b. processing means for executing the instructions;

C. external port means for accessing a plurality of external devices, the external devices including an external memory for storing instructions, the instructions including the instructions after the internal memory boundary;

d. means, responsive to the processor and prefetch means, but not responsive to the external devices, for blocking pre-fetch access to the port means when i. the prefetch means needs to access an instruction after the boundary; but ii. the port means is in use for one of the external devices other than the external memory.

* * * * *